United States Patent
Kim et al.

(10) Patent No.: US 8,669,948 B2
(45) Date of Patent: Mar. 11, 2014

(54) MOBILE TERMINAL

(75) Inventors: Chang Jae Kim, Seoul (KR); Sang Min Park, Seoul (KR); Seung Geun Lim, Seoul (KR); Hyun Lee, Seoul (KR); Kyoung Yong Kim, Seoul (KR); Tae Wha Choi, Gunpo-si (KR); Young Tae Im, Anyang-si (KR); Sung Hee Han, Seoul (KR); Da Na Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 743 days.

(21) Appl. No.: 12/885,228

(22) Filed: Sep. 17, 2010

(65) Prior Publication Data

US 2011/0069027 A1  Mar. 24, 2011

(30) Foreign Application Priority Data

Sep. 18, 2009 (KR) .................. 10-2009-0088584

(51) Int. Cl.
  *G06F 3/041* (2006.01)
  *H04M 1/00* (2006.01)

(52) U.S. Cl.
  USPC ...................................... 345/173; 455/550.1

(58) Field of Classification Search
  USPC ............... 345/87, 173, 178, 156, 211, 212; 455/550.1
  See application file for complete search history.

(56) References Cited

U.S. PATENT DOCUMENTS

2009/0201438 A1*  8/2009  Kim et al. ...................... 349/58
2009/0262085 A1* 10/2009  Wassingbo et al. ........... 345/173

* cited by examiner

*Primary Examiner* — Michael Faragalla
(74) *Attorney, Agent, or Firm* — Birch, Stewart, Kolasch & Birch, LLP

(57) ABSTRACT

A mobile terminal includes a front housing made of a light-transmitting material and provided with edge parts, at least one of which is rounded or bent to be inclined which causes optical illusions so as to provide visual mystique. A display unit is provided under the front housing. A circuit substrate is provided under the display unit. A rear housing is provided to accommodate the display unit and the circuit substrate together with the front housing. A middle housing is provided between the front housing and the rear housing. The middle housing includes a receipt part to accommodate the display unit, and boundary parts connecting the receipt part and edge parts of the middle housing and disposed under the edge parts of the front housing. The edge part of the middle housing is protruded from the boundary part of the middle housing in a horizontal direction.

18 Claims, 13 Drawing Sheets

FIG. 2
(a)
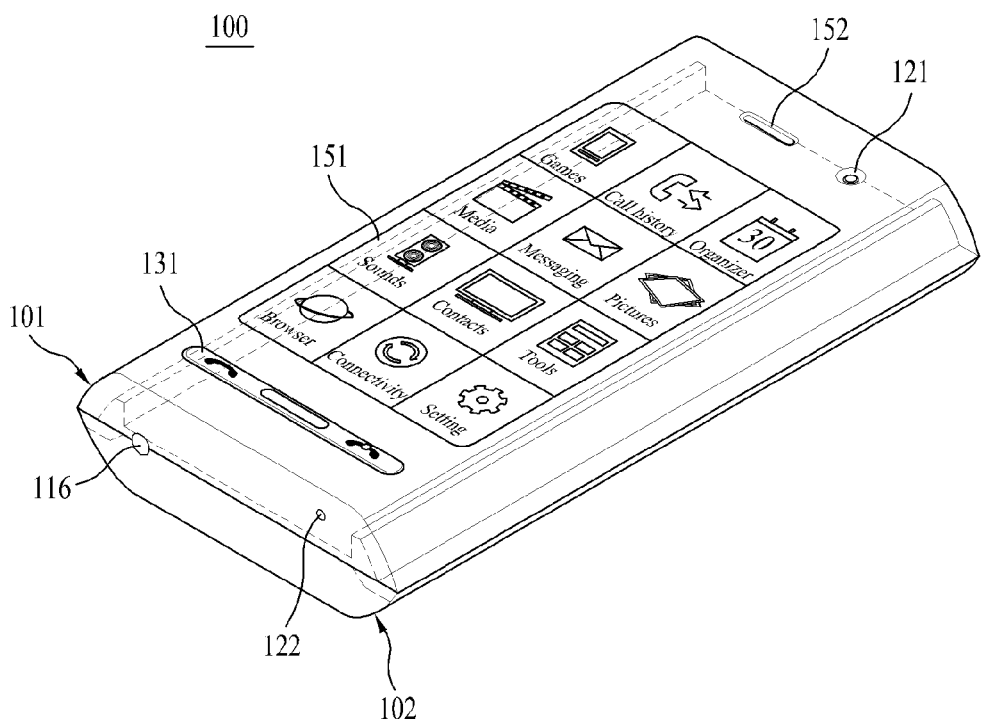
(b)
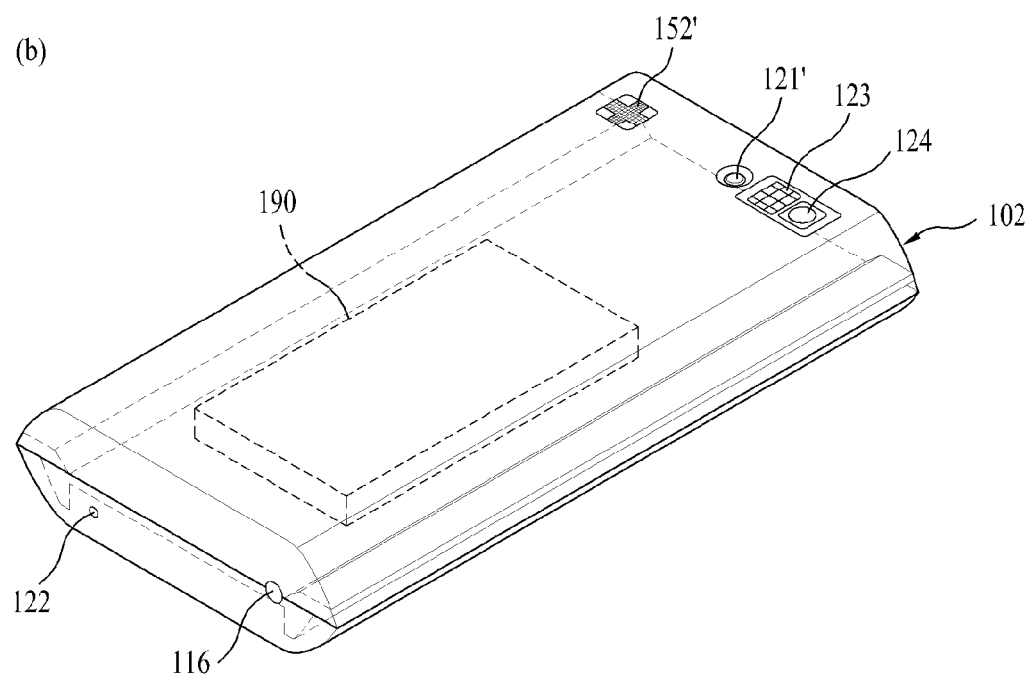

FIG. 6
(a)
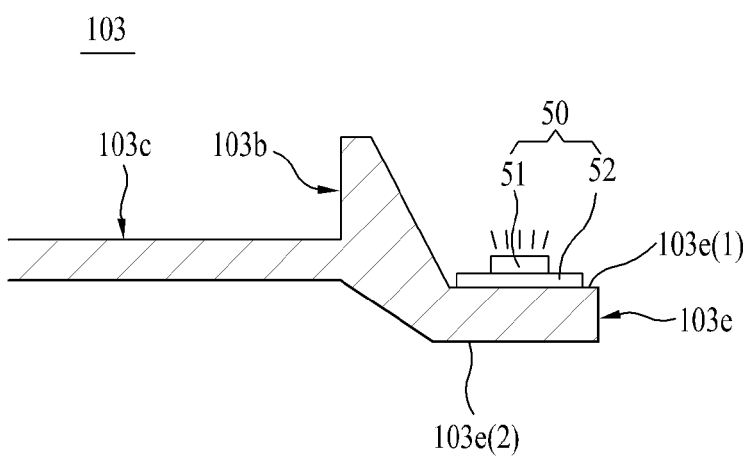
(b)
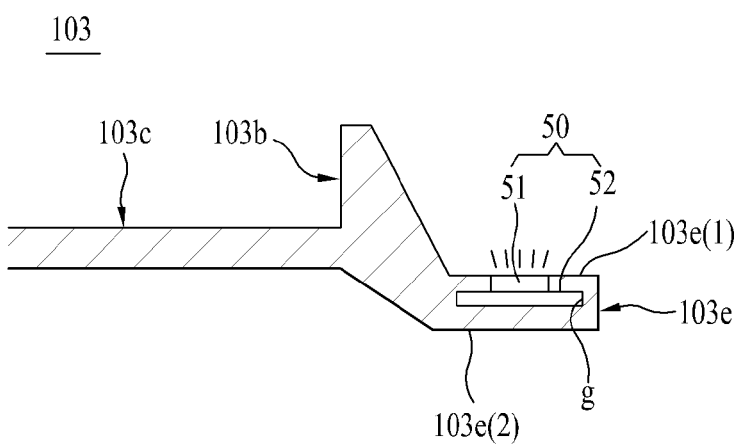
(c)
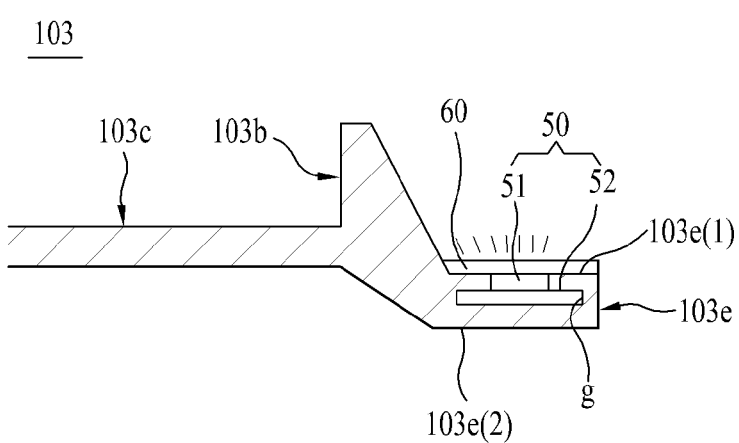

FIG. 7
(a)
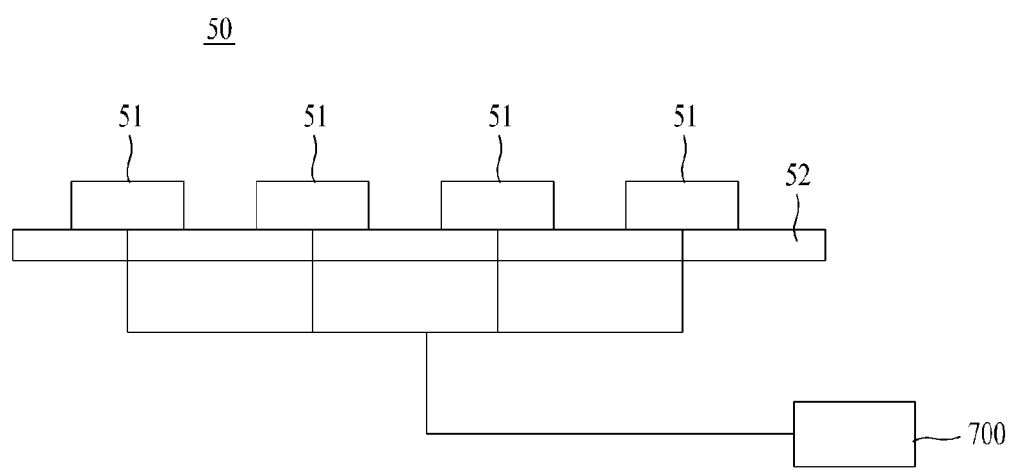
(b)
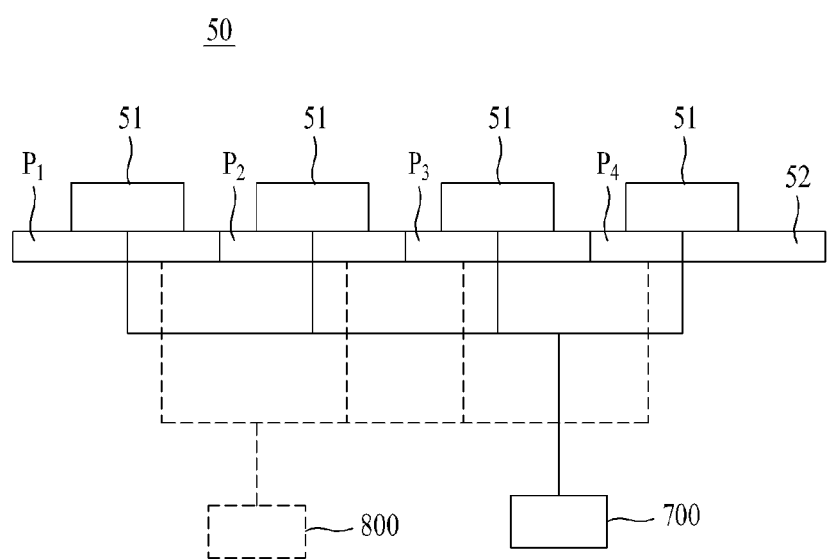

FIG. 9
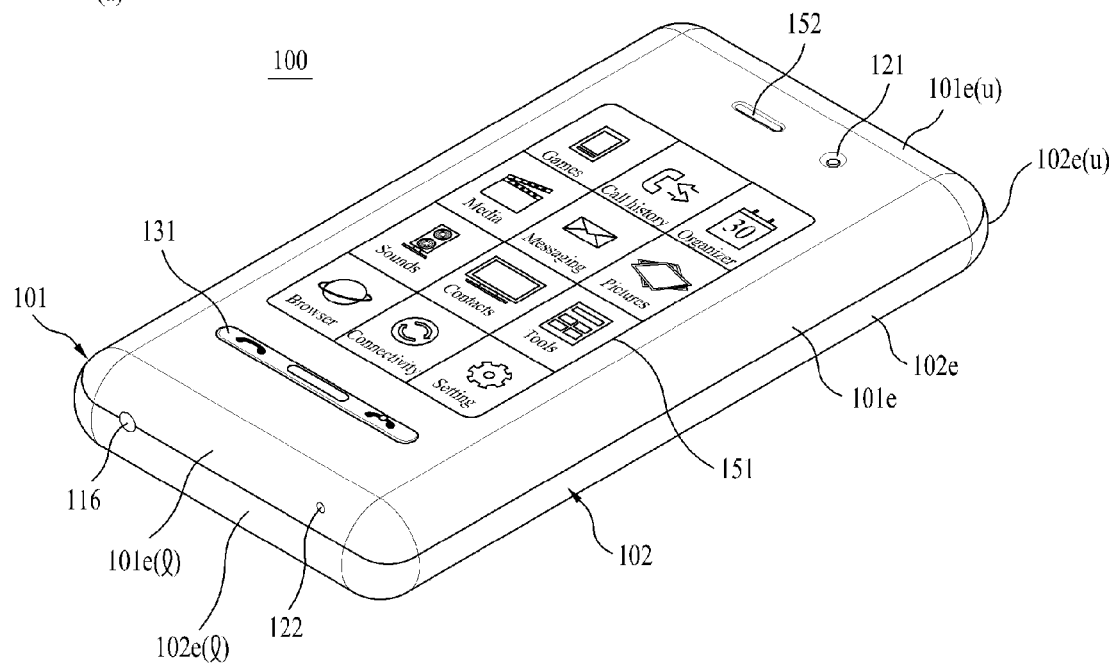
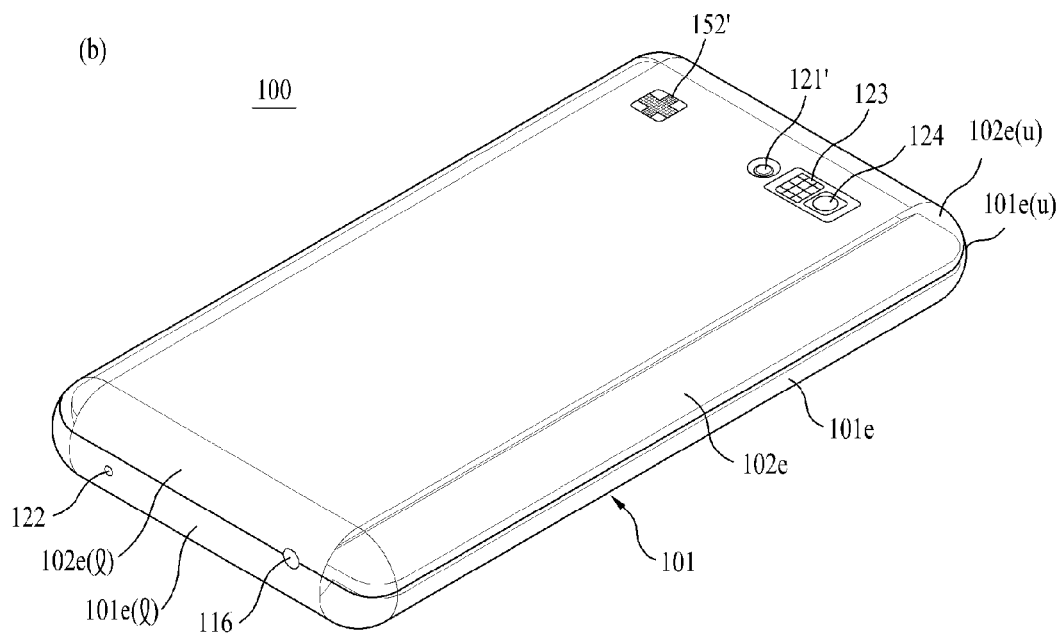

MOBILE TERMINAL

This application claims the benefit of Korean Patent Application No. 10-2009-0088584, filed on Sep. 18, 2009, which is hereby incorporated in its entirety by reference as if fully set forth herein.

BACKGROUND OF THE INVENTION

1. Field of the Invention

The present invention relates to a mobile terminal which causes optical illusions at edge parts of a front housing so as to provide visual mystique.

2. Discussion of the Related Art

Generally, terminals can be classified into mobile terminals and stationary terminals according to a presence or non-presence of mobility. And, the mobile terminals can be further classified into handheld terminals and vehicle mount terminals according to availability for hand-carry.

As functionality of the mobile terminal tends to be diversified, the mobile terminal is implemented as a multimedia player type equipped with composite functions including picture or video photographing, music or video file playback, games, broadcast reception and the like for example.

Recently, a mobile terminal equipped with a communication function and the like is frequently used as a communication means. Moreover, the mobile terminal tends to be equipped with a data processing function, a multimedia function and the like in various ways together with a function of the communication means. Thus, it becomes vaguer to discriminate the mobile terminal from a computer and the like.

In case of selecting such a mobile terminal, a consumer is able to select a mobile terminal according to sensitive and emotional satisfaction including a design of the mobile terminal and the like as well as the above described functions. Thus, an exterior of a mobile terminal plays a major role in selecting mobile terminals.

Generally, a mobile terminal equipped with a communication function can be classified by a bar type (e.g., a full touchscreen type, etc.), a folder type, a slide type or the like.

Such a mobile terminal includes a display unit to display an image, and the display unit has a bezel part having a designated thickness to mount and support an LCD panel displaying the image and to be electrically connected to the LCD panel.

The bezel part causes the apparent area of the display unit to be visually reduced, and efforts to reduce the area of the display unit in terms of design have been developed.

Further, methods of diversifying the design of edge parts of the mobile terminal to increase interest and satisfaction of users have been required.

SUMMARY OF THE INVENTION

Accordingly, the present invention is directed to a mobile terminal that substantially obviates one or more problems due to limitations and disadvantages of the related art.

An object of the present invention is to provide a mobile terminal which causes optical illusions at edge parts of a front housing so as to provide visual mystique.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this object and other advantages and in accordance with the purpose of the invention, as embodied and broadly described herein, a mobile terminal includes a front housing made of a light-transmitting material and provided with edge parts, at least one of which is rounded or bent to be inclined, a display unit provided under the front housing, a circuit substrate provided under the display unit, and a rear housing to accommodate the display unit and the circuit substrate together with the front housing.

The at least one edge part rounded or bent to be inclined may be extended from a display region shielding an upper surface of the display unit in a direction toward the rear housing, and at least a pair of edge parts being parallel with each other out of the edge parts of the front housing may be rounded or bent to be inclined.

In this case, the mobile terminal may further include a middle housing provided between the front housing and the rear housing, and the middle housing may include a receipt part to accommodate the display unit, and boundary parts connecting the receipt part and edge parts of the middle housing and disposed under the edge parts of the front housing.

One side surface of the boundary part may have a shape corresponding to the inner surface of the edge part of the front housing.

Further, the boundary part located under the inner surface of the edge part of the front housing may be provided with an inwardly inclined surface.

In this case, the edge part of the middle housing may be protruded from the boundary part of the middle housing in a horizontal direction.

The edge part of the front housing and an edge part of the rear housing may be extended to contact an upper surface and a lower surface of the edge part of the middle housing, respectively, and an outer surface of the mobile terminal may be formed to have a curved surface through the front housing, the middle housing, and the rear housing.

In this case, a plurality of LEDs may be mounted on the boundary part or the edge part of the middle housing under the condition that the plurality of the LEDs is separated from each other in the lengthwise direction of the boundary part or the edge part of the middle housing.

The mobile terminal may further include an LED circuit substrate, on which the plurality of the LEDs is mounted, and the LED circuit substrate may be mounted on the boundary part or the edge part of the middle housing.

The LED circuit substrate may be embedded in the boundary part or the edge part of the middle housing.

In this case, a diffusion member to diffuse light may be provided on upper surfaces of the plurality of the LEDs.

The LED circuit substrate may include a plurality of touch sensors or proximity sensors.

In this case, the LED circuit substrate may be divided into a plurality of touch regions in which the touch sensors or the proximity sensors are respectively mounted, and at least one LED may be mounted in each touch region.

Further, a touch signal or a proximity signal sensed by the touch sensor or the proximity sensor provided in a specific touch region out of the touch regions may be used as a control signal of the LED mounted in the specific touch region.

An outer surface of the edge parts of the front housing may be a curved surface, and an inner surface of the edge parts of the front housing may be a flat surface.

The rear housing may be made of a light-transmitting material and be provided with edge parts, at least one of which is rounded or bent to be inclined.

In another aspect of the present invention, a mobile terminal includes a front housing made of a light-transmitting material, and provided with edge parts, at least one of which is rounded or bent to be inclined, and a plurality of openings including at least a first opening and a second opening, a display unit mounted in the first opening of the front housing, and at least one user input unit mounted in the second opening of the front housing and enabling a plurality of user inputs.

A window may be mounted at least one of the plurality of openings.

In a further aspect of the present invention, a mobile terminal includes a display unit, at least one housing to accommodate the display unit, and at least one curved edge part, an outer surface of which is rounded, attached to a side surface of the at least one housing and made of a light-transmitting material.

An inner surface of the at least one curved edge part may be a flat surface bent to be inclined.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 2(a) and 2(b) are perspective views of a mobile terminal in accordance with the present invention;

FIGS. 6(a) to 6(c) are sectional views of examples of a middle housing of the mobile terminal in accordance with the present invention;

FIGS. 7(a) and 7(b) are views illustrating examples of an illumination unit of the mobile terminal in accordance with the present invention;

FIGS. 9(a) and 9(b) are perspective views of a mobile terminal in accordance with another embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
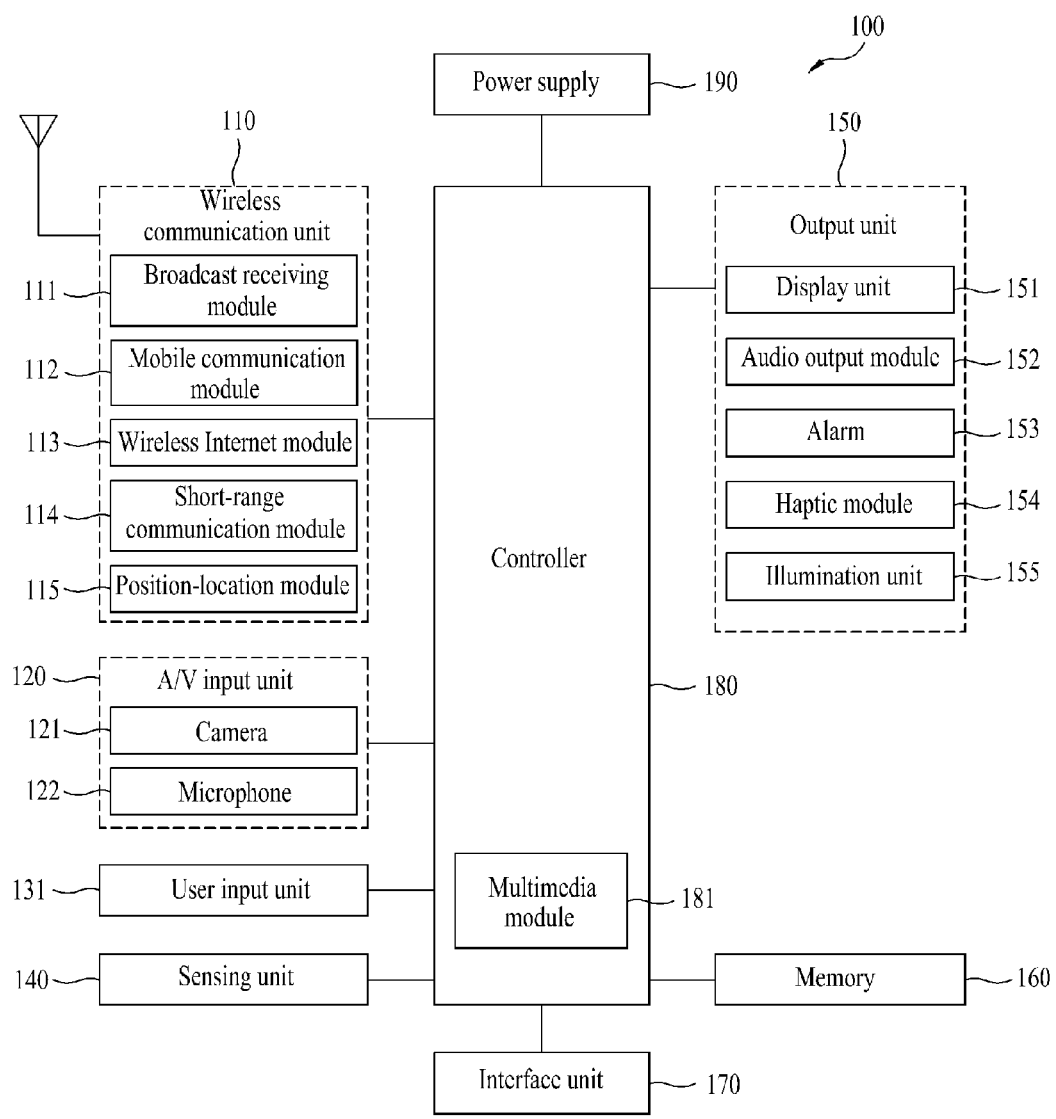
FIG. 1 is a block diagram of a mobile terminal in accordance with one embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 131, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESC) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Meanwhile, the A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display unit 151.

The image frame processed by the camera module 121 is stored in the memory 160 or can be externally transmitted via the wireless communication unit 110. At least two camera modules 121 can be provided according to a configuration type of the terminal.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 131 generates input data responsive to user manipulation of an associated input device or devices. Examples of such devices include a keypad, a dome switch, a touchpad such as static pressure/capacitance, a jog wheel and a jog switch. A specific example is one in which the user input unit 131 is configured as a touchpad in cooperation with a display unit, which will be described in more detail below.

The sensing unit 140 detects such a current configuration of the mobile terminal 100 as an open/closed configuration of the mobile terminal 100, a location of the mobile terminal 100, a presence or non-presence of user contact and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 170 and the like.

Further, the sensing unit 140 may include a plurality of touch sensors or proximity sensors so as to control touch signals or proximity signals and operation of the illumination unit 155 in an interlocking state. A detailed description thereof will be given later.

The output unit 150 is configured to output an audio signal, a video signal and/or an alarm signal. And, the output unit 150 can include the display unit 151, an audio output module 152, an alarm output module 153, a haptic module 154, an illumination unit 155 and the like.

The display unit 151 is typically implemented to visually display (output) information associated with the mobile terminal 100. For instance, if the mobile terminal is operating in a phone call mode, the display unit will generally provide a user interface (UI) or graphical user interface (GUI) which includes information associated with placing, conducting, and terminating a phone call.

The display unit 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays. For instance, both an outer display unit (not shown in the drawing) and an inner display unit (not shown in the drawing) can be provided to the mobile terminal 100.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The illumination unit 155 can be provided for various illumination effects of the mobile terminal 100. For instance, recently, mobile terminals tend to provide a user input unit with an illumination function. For this, the illumination unit 155 can be provided separate from a backlight of the display unit 151. And, the illumination unit 155 can include light emitting diodes (LED) and the like, which shall be described later in this disclosure.

The illumination unit 155 provides an illumination effect to the exterior of a terminal body of the mobile terminal in addition to the user input unit 131. A detailed method thereof will be described later.

The memory 160 can store programs for the processing and control of the controller 180 and is also able to perform a function for temporary storage of inputted/outputted data (e.g., phonebook data, message data, still picture data, moving picture data, etc.). Moreover, the memory 160 can store data of various patterns of vibration and sound outputted in case of the touch input to the touchscreen.

The memory 160 can include at least one storage medium of such a type as a flash memory type, a hard disk type, a multimedia card micro type, a card type memory (e.g., SD memory, XD memory, etc.), RAM and ROM. Moreover, the mobile terminal 100 is able to operate a web storage that performs a storage function of the memory 160 on internet.

The interface unit 170 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 170 receives data from the external device or is supplied with power. The interface unit 170 then delivers the received data or the supplied power to the corresponding component within the mobile terminal 100 or transmits data within the mobile terminal 100 to the corresponding external device.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

The controller 180 may include control units to control the respective parts. For example, the controller 180 may include an illumination unit control unit (not shown) to control the illumination unit 155 and a touch control unit to receive a user touch input and then convert the touch input into an electrical signal. That is, it may be understood that the controller 180 includes the control units to control functions of the respective parts.

The power supply 190 receives an external and/or internal power source and then supplies power required for operations of the respective components, under the control of the controller 180.

In the above description so far, the mobile terminal according to the present invention is described in aspect of components according to functions. In the following description, a mobile terminal according to the present invention is explained in aspect of components according to an exterior.

In the following description, for clarity, a bar type mobile terminal is selected for example from mobile terminals of various types including a folder type, a bar type, a swing type, a slider type and the like. Therefore, the present invention is non-limited by the bar type mobile terminal but is applicable to mobile terminals of all types including the above-mentioned types.

FIGS. 2(a) and 2(b) are perspective views of a mobile terminal in accordance with the present invention. In more detail, FIG. 2(a) is a perspective view of the front surface of the mobile terminal in accordance with the present invention, and FIG. 2(b) is a perspective view of the rear surface of the mobile terminal shown in FIG. 2(a).

The mobile terminal 100, as shown in FIG. 2(a), is provided with a bar type terminal body.

The mobile terminal 100 in accordance with the present invention includes a front housing 101 made of a light-transmitting material and provided with edge parts, at least one of which is rounded or bent to be inclined, the display unit 151 provided under the front housing 101, a circuit substrate (not shown) provided under the display unit 151, and a rear housing 102 to accommodate the display unit 151 and the circuit substrate together with the front housing 101.

When at least one edge part of the front housing 101 is rounded or bent to be inclined, an optical illusion is caused due to a lens effect, which will be described later.

In this embodiment, a housing forming the external appearance of the terminal body is divided into the front housing 101 and the rear housing 102. Various electronic parts are installed in a space formed between the front housing 101 and the rear housing 102. At least one middle housing may be additionally disposed between the front housing 101 and the rear housing 102. A detailed description thereof will be given later.

Housings forming the external appearance of a terminal body of a mobile terminal may be formed by injection molding a synthetic resin, or may be made of a metal, such as stainless steel (STS) or titanium (Ti).

Particularly, in the mobile terminal 100 in accordance with the present invention, at least one of the front housing 101 and the rear housing 102 forming the external appearance of the mobile terminal 100 is made of a light-transmitting material, and at least one edge part thereof is rounded or bent to be inclined.

That is, at least a pair of edge parts being parallel with each other out of all edge parts of the front housing 101 may be rounded or bent to be inclined. FIGS. 2(a) and 2(b) illustrate that a pair of edge parts disposed in the vertical direction out of all edge parts of the front housing 101 is rounded.

The front housing 101 may be provided with an opening to expose the display unit 151 displaying an image so that the display unit 151 is exposed to the outside through the opening. Otherwise, the front housing 101 may be made of a light-transmitting material so as to cover the display unit 151.

In the former case, the thickness of the terminal body of the mobile terminal 100 is reduced and touch sensitivity of the mobile terminal 100 is increased. In the latter case, unification and mystique of the external appearance of the mobile terminal 100 are increased. The former case, in which the display unit 151 is exposed to the outside through the opening formed through the front housing 101, will be described later.

FIGS. 2(a) and 2(b) illustrate the latter case. That is, in the embodiment, as shown in FIGS. 2(a) and 2(b), the front housing 101 made of a light-transmitting material so as to cover the display unit 151 is employed.

Further, at least one edge part of the front housing 101 is rounded or bent to be inclined. When the edge parts 101e of the front housing 101 are rounded or bent to be inclined, a gripping sense of a user is improved and the lens effect, which will be described later, is obtained, simultaneously. A detailed description of the lens effect will be given later.

The display unit 151, the audio output module 152, the camera 121, and the user input unit 131 are disposed on the front housing 101 of the terminal body of the mobile terminal 100. Further, the microphone 122 is disposed on the lower surface of the terminal body of the mobile terminal 100. Of course, the microphone 122 may be disposed on the upper surface of the front housing 101.

The display unit 151 is located under the front housing 101, and occupies most of the area of the front housing 101.

The user input unit 131 is manipulated so as to receive a command to control the operation of the mobile terminal 100, and includes a plurality of user input parts. The user input unit 131 may be any type as long as the user input unit 131 is manipulated by a user in a tactile manner.

Contents input by the user input unit 131 may be variously set.

FIG. 2(b) is a perspective view of the rear surface of the mobile terminal shown in FIG. 2(a).

Referring to FIG. 2(b), a camera 121' can be additionally provided to a backside of the terminal body, and more particularly, to the rear housing 102. The latter camera 121' has a photographing direction that is substantially opposite to that of the former camera 121 shown in FIG. 2(a) and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject immediately. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected on the mirror 124.

An additional audio output unit 152' can be provided to the backside of the terminal body. The additional audio output unit 152' is able to implement a stereo function together with the former audio output unit 152 shown in FIG. 2 (a) and may be used for implementation of a speakerphone mode in talking over the terminal.

In addition to an antenna for call, an antenna (not shown) for broadcast signal reception may be additionally disposed on the side surface of the terminal body or within the terminal body.

A power supply unit 190 for supplying a power to the mobile terminal 100 is provided to the terminal body. And, the power supply unit 190 can be configured to be built in the terminal body. Alternatively, the power supply unit 190 can be configured to be detachably connected to the terminal body.

Further, in the same manner as the front housing 101, as shown in FIG. 2(a), the rear housing 102 is also made of a light-transmitting material, and at least one edge part of the rear housing 102 is rounded or bent to be inclined. This configuration also serves to improve a gripping sense of a user and to induce the lens effect.

Figure 3:
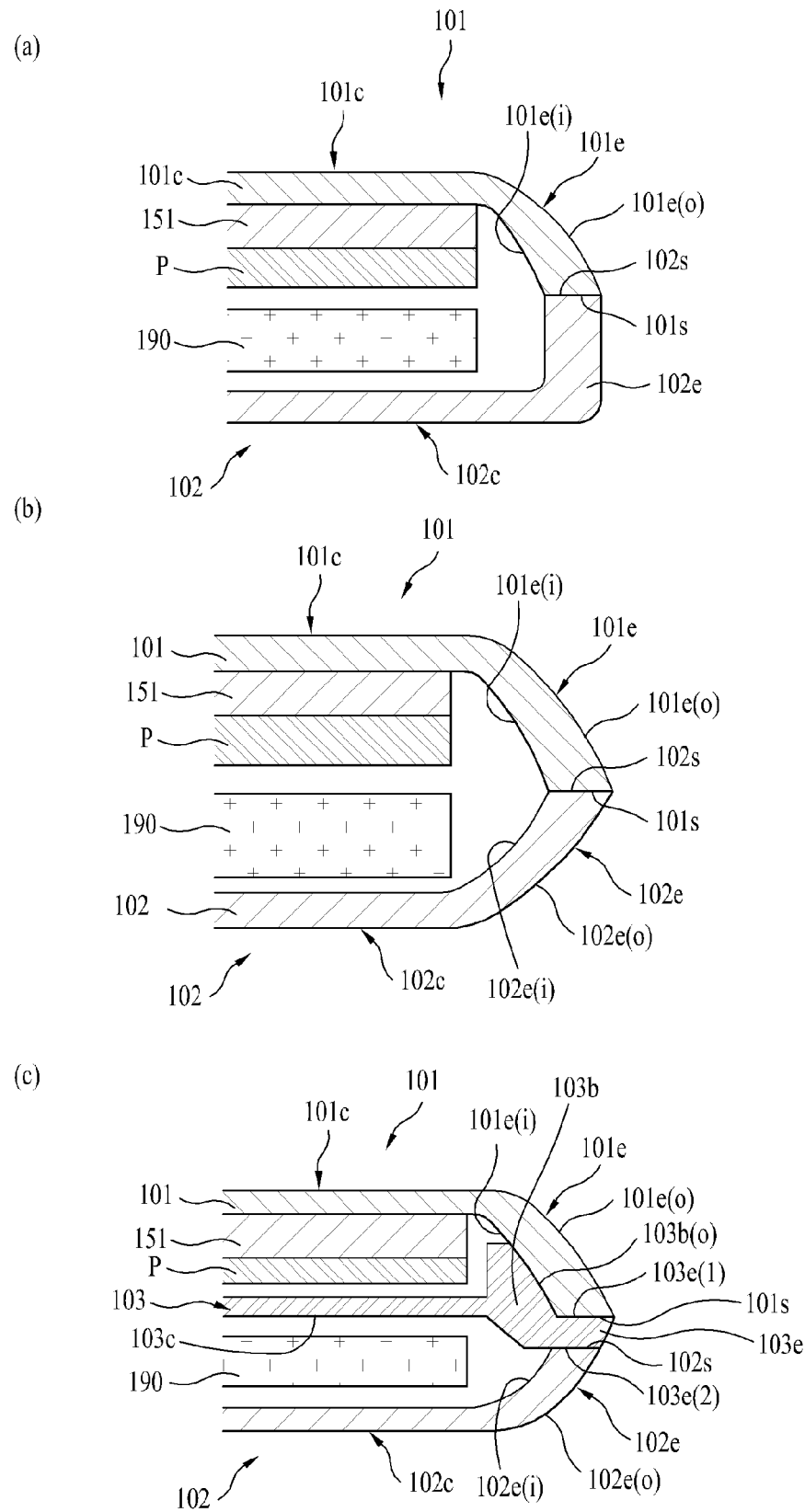
FIGS. 3(a) to 3(c) are sectional views of examples of edge parts of the mobile terminal in accordance with the present invention.

FIGS. 3(a) to 3(c) are sectional views of examples of edge parts of the mobile terminal in accordance with the present invention. In more detail, FIG. 3(a) illustrates the mobile terminal in which only front housing edge parts 101e are rounded, FIG. 3(b) illustrates the mobile terminal in which both front housing edge parts 101e and rear housing edge parts 102e are rounded, and FIG. 3(c) illustrates the mobile terminal in which both the front housing edge parts 101e and the rear housing edge parts 102e are rounded and a middle housing 103 is further provided between the front housing 101 and the rear housing 102. In FIGS. 3(a) to 3(c), a redundant description of the same or similar parts will be omitted.

First, with reference to FIG. 3(a), the mobile terminal in which only the front housing edge parts 101e are rounded will be described.

The front housing 101 includes a display region 101c provided on the upper surface of the display unit 151 of the mobile terminal to display the image of the display unit 151, and the front housing edge parts 101e extended from the end of the display region 101c, rounded and bent to be inclined, and then extended to the rear housing edge parts 102e forming the rear surface of the terminal body.

The display unit 151 is provided under the front housing 101, and a circuit substrate P on which various electronic parts are mounted is provided under the display unit 151. The power supply unit 190 is provided between the rear housing 102, forming the external appearance of the mobile terminal together with the front housing 101, and the circuit substrate P.

The front housing edge parts 101e are rounded to have a gentle inclination angle. Both an inner surface 101e(i) and an outer surface 101e(o) of the front housing edge part 101e may be rounded, or at least one of the inner surface 101e(i) and the outer surface 101e(o) of the front housing edge part 101e may be a flat surface having a designated inclination angle. A lower end 101s of the front housing edge part 101e may be extended so as to contact an upper end 102s of the rear housing edge part 102e.

In the mobile terminal, as shown in FIG. 3(b), the rear housing edge parts 102e as well as the front housing edge parts 101e are rounded.

The rear housing 102 is also made of a light-transmitting material.

As shown in FIG. 3(b), the front housing edge parts 101e and the rear housing edge parts 102e are rounded, thereby improving the gripping sense as well as exhibiting the lens effect.

Differing from the mobile terminal shown in FIG. 3(b), the mobile terminal shown in FIG. 3(c) further includes the middle housing 103 between the front housing 101 and the rear housing 102.

The middle housing 103 includes a receipt part 103c to accommodate the display unit 151, and boundary parts 103b connecting the receipt part 103c and middle housing edge parts 103e and disposed under the front housing edge parts 101e.

In more detail, the middle housing 103 is divided into the receipt part 103c located at a position corresponding to the display unit 151 to accommodate the display unit 151 and the circuit substrate P, the middle housing edge parts 103e extended to a gap between the front housing 101 and the rear housing 102, and the boundary parts 103b connecting the receipt part 103c and the middle housing edge parts 103e.

The middle housing edge part 103e is protruded from the boundary part 103b of the middle housing 103 in the horizontal direction. Further, an upper surface 103e(1) and a lower surface 103e(2) of the middle housing edge part 103e contact the lower end 101s of the front housing edge part 101e and the upper end 102s of the rear housing edge part 102e, respectively.

One side surface of the boundary part 103b of the middle housing 103 has a shape corresponding to the inner surface 101e(i) of the front housing edge part 101e. In more detail, an inclined surface 103b() having about the same inclination angle as the inner surface 101e(i) of the front housing edge part 101e is formed on the boundary part 103b of the middle housing 103. That is, the boundary part 103b under the inner surface 101e(i) of the front housing edge part 101e has the inclined surface 103b(o), which is inwardly inclined. Further, the outer surface 101e(o) of the front housing edge part 101e may be a curved surface, and the inner surface 101e(i) of the front housing edge part 101e may be a flat surface.

The inclination angle of the inclined surface 103b(o) may be in the range of about 50 degrees to 70 degrees. Of course, the inclination angle of the inclined surface 103b(o) may be determined in consideration of a curvature of the front housing edge part 101e.

That is, kinds of lens effects may be varied according to such an angle.

The boundary part 103b has an upward protruding shape due to formation of the inclined surface 103b(o), and thus the receipt part 103c is formed in a recess shape between the middle housing edge parts 103e formed at both edges of the middle housing 103.

Further, the front housing edge part 101e and the rear housing edge part 102e are extended to contact the upper surface 103e(1) and the lower surface 103e(2) of the middle housing edge part 103e, respectively, and the front housing 101, the middle housing 103, and the rear housing 102 form a curved surface of the exterior of the terminal body.

Therefore, the side surfaces of the mobile terminal are generally curved, thereby improving the gripping sense of a user.

Figure 4:
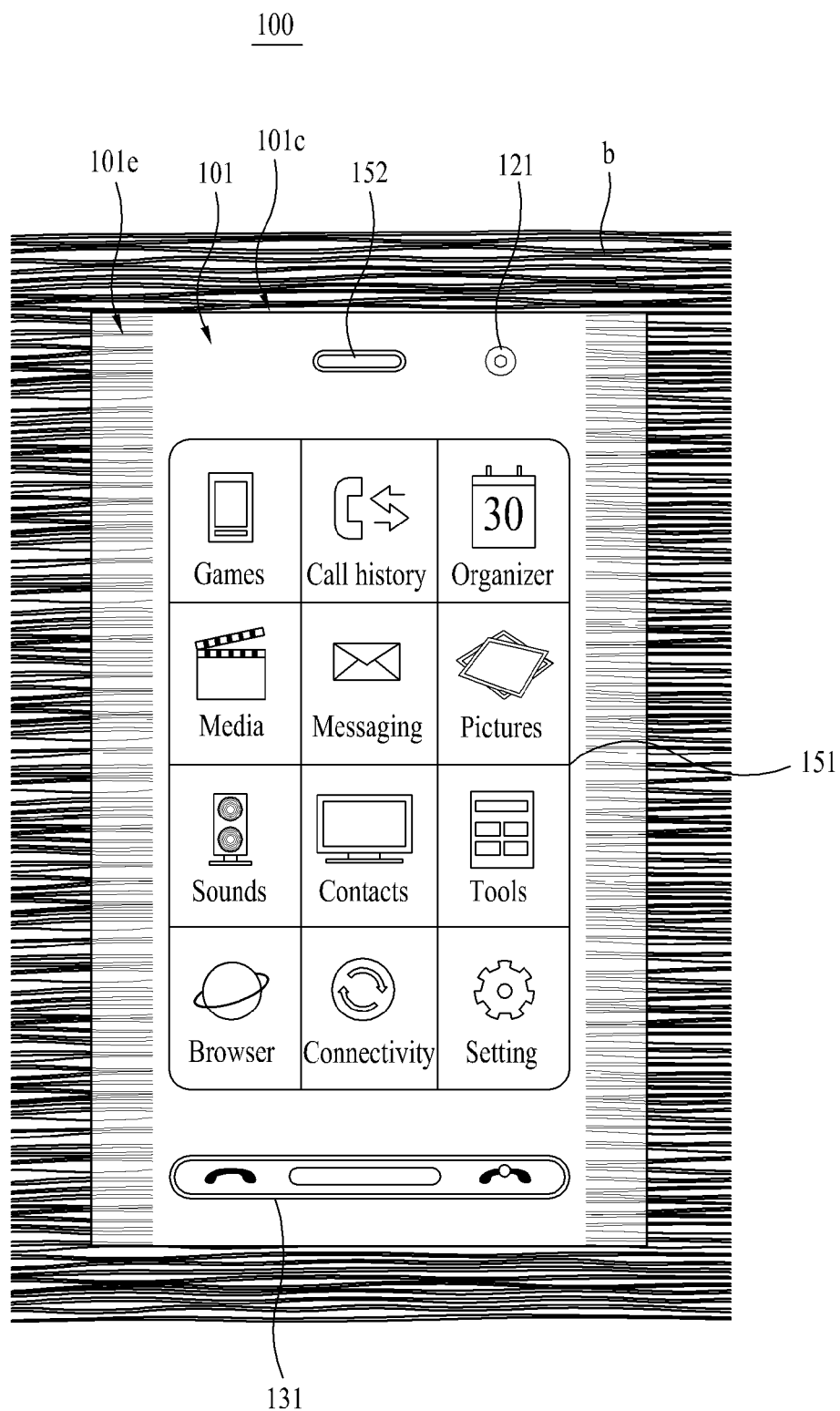
FIG. 4 is a plan view of the mobile terminal in accordance with the present invention.

FIG. 4 is a plan view of the mobile terminal in accordance with the present invention. In more detail, FIG. 4 is a plan view of the mobile terminal shown in FIG. 3(c).

The mobile terminal 100 includes the front housing 101 made of a light-transmitting material and provided with edge parts, at least one of which is rounded, as described above. Therefore, an image displayed on the display unit 151 provided under the front housing 101 may be seen through the front housing 101.

The front housing 101, as described above, includes the display region 101c provided on the upper surface of the display unit 151 to display an image, and the front housing edge parts 101e extended from the end of the display region 101c and rounded and bent.

The lower ends 101s of the front housing edge parts 101e contact the upper surfaces 103e(1) of the middle housing edge parts 103e, as shown in FIG. 3(c).

Therefore, if the front housing edge parts 101e are not rounded or bent, when seen from an area above the mobile terminal 100, the upper surfaces 103e(1) of the middle housing edge parts 103e are observed.

However, if the front housing edge parts 101e are rounded as in the mobile terminal 100 in accordance with the present invention, an object located on the rear surface of the rear housing 102 may be observed.

That is, as shown in FIG. 4, parts (the middle housing edge parts 103e) corresponding to the bezel part of the display unit 151 are not visible, but the shape of a holding plane b may be visible using the display region 101c as a boundary. An effect in which the shape of an object located under the front housing 101 made of a transparent material is not observed but a region around an area under the front housing edge part 101e is observed is referred to as a lens effect.

Such a lens effect induces an optical illusion effect in which the bezel part around the display unit of the mobile terminal are visually removed, thereby allowing an area of the display to seem to be widened compared with a product size.

In order to obtain the lens effect, the edge of the front housing 101 is rounded or both side surfaces of the mobile terminal 100 are formed in an ergonomically curved plane, thereby improving a gripping sense of a user. Now, a principle to obtain such a lens effect will be described with reference to FIG. 5.

Figure 5:
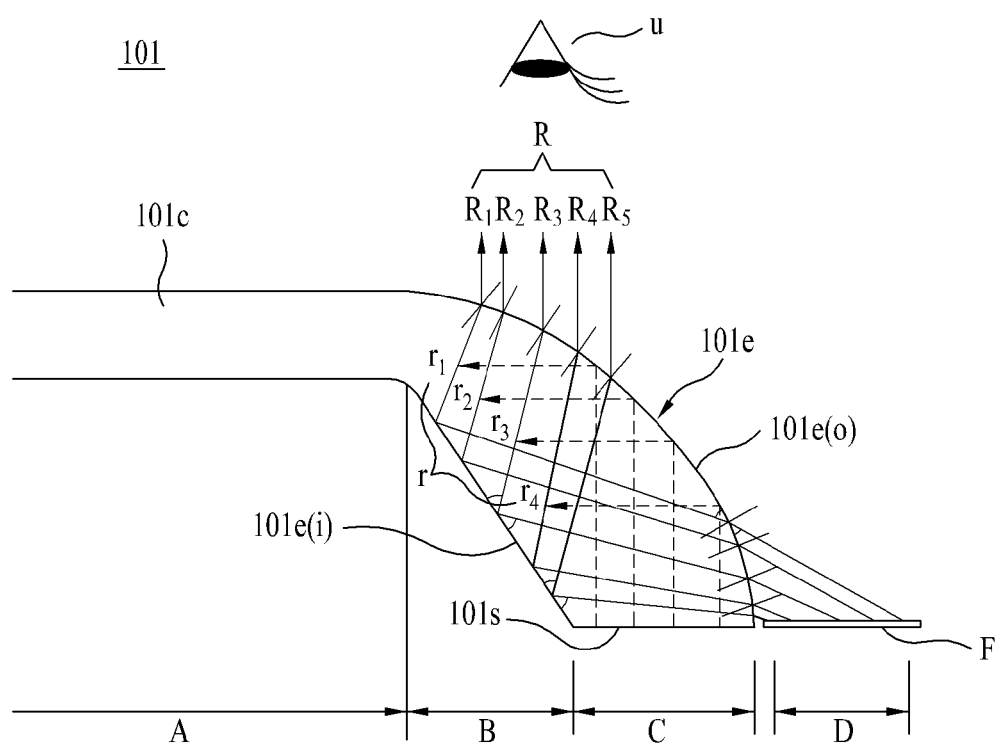
FIG. 5 is a sectional view of a front housing of the mobile terminal in accordance with the present invention.

FIG. 5 is a sectional view of the front housing 101 of the mobile terminal in accordance with the present invention.

First, for convenience of description, an area under the front housing edge part 101e is divided, as follows. That is, a region under the display region 101c of the front housing 101 is defined as a region A, a region under the inner surface 101e(i) of the front housing edge part 101e is defined as a region B, a region corresponding to the lower end 101s of the front housing edge part 101e is defined as a region C, and a region at the outside of the front housing edge part 101e is defined as a region D.

The display unit 151 is located in the region A. Light supplied from an image displayed on the display unit 151 passes through the display region 101c in the vertical direction, and then a user u sees the image through the light.

A part of light supplied from the region B is reflected or scattered at the inside of the front housing edge part 101e. That is, in the region B, a part of light is supplied to the user u, and the other part of light is scattered.

Therefore, the user u does not precisely observe the shape of the inside of the region B.

In the region C, light incident upon the lower end 101s of the front housing edge part 101e is completely reflected by the outer surface 101e(o) of the front housing edge part 101e, and thus the user u does not completely see the shape of the inside of the region C. That is, the user u does not observe the shape of an object, located in the region C, in the vertical direction, and thus the region C corresponds to a region which is not observed due to the lens effect.

However, in the region D which is a region at the outside of the front housing edge part 101e, among light supplied from an object F, beams R1, R2, R3, R4, and R5 obliquely incident upon the outer surface 101e(o) of the front housing edge part 101e are completely reflected by the inner surface 101e(i) of the front housing edge part 101e and then pass through the outer surface 101e(o) of the front housing edge part 101e, thereby reaching the user u.

Therefore, the user u above the outer surface 101e(o) of the front housing edge part 101e observes light supplied from the region D.

As described above, light incident upon the outer surface 101e(o) of the front housing edge part 101e is completely reflected at the inside of the front housing edge part 101e and then is emitted through the outer surface 101e(o) of the front housing edge part 101e. Thus, the user u may observe an object located at the outside of the front housing edge part 101e other than an image formed by beams r1, r2, r3, and r4 incident from the region C in the vertical direction.

Therefore, the front housing edge parts 101e are rounded or bent to be inclined, thereby causing optical illusions due to the lens effect.

FIGS. 6(a) to 6(c) are sectional views of some examples of the middle housing 103 of the mobile terminal in accordance with the present invention. In more detail, FIG. 6(a) illustrates the middle housing 103 in which an illumination unit 50 is mounted on the upper surface 103e(1) of the middle housing edge part 103e, FIG. 6(b) illustrates the middle housing 103 in which an LED circuit substrate 52 constituting the illumination unit 50 is embedded in the middle housing edge part 103e, and FIG. 6(c) illustrates the middle housing 103 in which a diffusion member 60 is provided on the upper surface of the illumination unit 50.

Plural LEDs 51 constituting the illumination unit 50, which are separated from each other in the lengthwise direction of the boundary part 103b or the middle housing edge part 103e, may be mounted on the boundary part 103b or the middle housing edge part 103e.

In the middle housing 103, as shown in FIG. 6(a), the illumination unit 50 is provided on the upper surface 103e(1) of the middle housing edge part 103e. As seen from an area above the front housing 101, an object located on the upper surface 103e(1) of the middle housing edge part 103e is not observed due to the lens effect. Therefore, although the illumination unit 50 is installed on the upper surface 103e(1) of the middle housing edge part 103e, the LEDs 51 constituting the illumination unit 50 do not visible, and thus an indirect illumination effect may be obtained.

Light generated by the LEDs 51 of the illumination unit 50 is completely reflected and diffused in the front housing edge part 101e (with reference to FIG. 3(c)), thereby providing mystique.

As shown in FIG. 6(a), the LED circuit substrate 52 constituting the illumination unit 50 is mounted on the upper surface 103e(1) of the middle housing edge part 103e. The plural LEDs 51, which are separated from each other, are mounted on the upper surface of the LED circuit substrate 52. The LEDs 51 may be provided in proper number in consideration of the length of the middle housing edge part 103e.

FIG. 6(b) illustrates the middle housing 103 in which the LED circuit substrate 52 constituting the illumination unit 50 is embedded in the middle housing edge part 103e. If the illumination unit 50 is provided on the inclined surface of the boundary part 103b of the middle housing 103, the LED circuit substrate 52 constituting the illumination unit 50 may be embedded in the inclined surface of the boundary part 103b of the middle housing 103.

If the LED circuit substrate 52 constituting the illumination unit 50 is embedded in the middle housing edge part 103e, exposure of the LED circuit substrate 52 constituting the illumination unit 50 to the outside is prevented. Although FIG. 6(b) illustrates that only the upper surfaces of the LEDs 51 are exposed to the outside, the side surfaces of the LEDs 51 as well as the upper surfaces of the LEDs 51 may be exposed to the outside.

FIG. 6(c) illustrates the middle housing 103 in which the diffusion member 60 is further provided on the middle housing 103 of FIG. 6(d). As shown in FIG. 6(c), only the upper surfaces of the LEDs 51 are exposed to the outside, and the diffusion member 60 is provided on the exposed upper surfaces of the LEDs 51 so as to diffuse light supplied from the LEDs 51.

The diffusion member 60 has a larger area than the total area of the upper surfaces of the LEDs 51, thereby diffusing light supplied from the illumination unit 50.

As described above, the illumination unit 50 is provided on the middle housing edge part 103e, thereby providing an illumination effect to the whole of the front housing edge part 101e (with reference to FIG. 3(c)). Further, light incident upon the front housing edge part 101e is completely reflected, diffused, and scattered within the front housing edge part 101e, thereby exhibiting the same effect as emission of light through the whole of the front housing edge part 101e.

Further, the illumination unit 50 may be provided on the upper surface of the front housing edge part 101e or within the front housing edge part 101e, or may be provided on the inclined surface forming the outer surface of the boundary part 103b.

FIGS. 7(a) and 7(b) are views illustrating examples of the illumination unit of the mobile terminal in accordance with the present invention.

FIG. 7(a) illustrates the illumination unit 50 in which plural LEDs 51 separated from each other are mounted on the LED circuit substrate 52. The plural LEDs 51 separated from each other by a predetermined interval are mounted on the LED circuit substrate 52. The respective LEDs 51 are independently controlled by an illumination unit control unit 700. That is, the illumination unit control unit 700 sequentially or simultaneously turns on and off the LEDs 51.

That is, the illumination unit control unit 700 may obtain various illumination effects in predetermined manners. For example, the illumination unit control unit 700 may turn on the LEDs 51 simultaneously with operation of the display unit 151, or turn on the LEDs 51 simultaneously with operation of the alarm unit 153. Further, a plurality of touch sensors or proximity sensors may be provided on the LED circuit substrate 52 constituting the illumination unit 50, and thus the illumination unit control unit 700 may control operation of the LEDs 51 and a plurality of touch signals or proximity signals by means of touch inputs in an interlocking state. A detailed description thereof will be given with reference to FIG. 7(b). Here, a case in which touch sensors are mounted on the LED circuit substrate 52 will be described.

FIG. 7(b) illustrates the illumination unit 50 in which the LEDs 51 are mounted on the upper surface of the LED circuit substrate 52 constituting the illumination unit 50, the LED circuit substrate 52 is divided into a plurality of touch regions P1, P2, P3, and P4, and electrostatic touch sensors (not shown) to sense a touch input are respectively mounted in the touch regions P1, P2, P3, and P4. Here, it is assumed that at least one LED 51 is mounted in each of the respective touch regions P1, P2, P3, and P4. A description of parts of FIG. 7(b) which are substantially the same as or similar to those of FIG. 7(a) will be omitted.

The LED circuit substrate 52 is divided into the plural touch regions P1, P2, P3, and P4, and touch input signals sensed by the respective touch regions P1, P2, P3, and P4 are converted into electrical signals by a touch control unit 800.

The LED circuit substrate 52 is provided with the plural touch sensors respectively in the touch regions P1, P2, P3, and P4, and thus senses touch signals directed to the respective touch regions P1, P2, P3, and P4.

Further, when the LEDs 51 are respectively mounted in the touch regions P1, P2, P3, and P4, touch inputs and the illumination unit 50 are controlled in an interlocking state, thereby providing a more mysterious illumination effect. A touch signal sensed by the touch sensor provided in a specific touch region P1, P2, P3, or P4 among the plural touch regions P1, P2, P3, and P4 is used as a control signal of the LED 51 mounted in the specific touch region P1, P2, P3, or P4.

That is, only the LED 51 corresponding to the specific touch region may be turned on, or only the LEDs 51 corresponding to the touch regions except for the specific touch region may be turned on. Otherwise, there may be a time difference between touch inputs and the turning-on and off of the LEDs 51. Thereby, various illumination effects may be provided.

Figure 8:
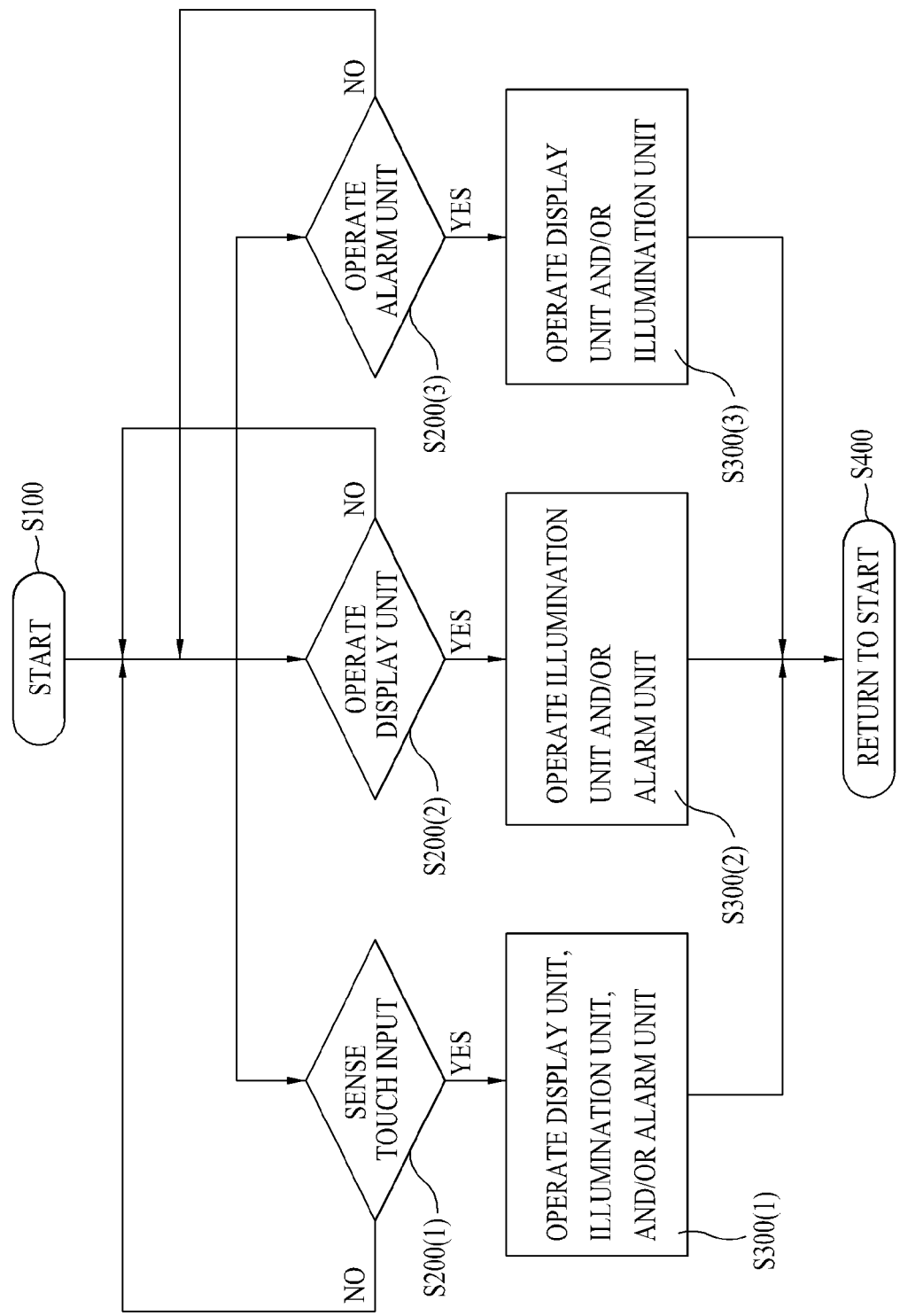
FIG. 8 is a block diagram illustrating an operating method of the mobile terminal in accordance with the present invention.

FIG. 8 is a block diagram illustrating an operating method of the mobile terminal in accordance with the present invention. Here, it is assumed that both LEDs and touch sensors are mounted on the LED circuit substrate constituting the illumination unit.

First, when a touch sensor senses a touch input (S200(1)), at least one of the display unit 151, the illumination unit 50 and the alarm unit 153 is operated (S300(1)). That is, if a user touches the front housing edge part 101e, the display unit 151 and/or the illumination unit 50 is operated, and the alarm unit 153 is vibrated to provide vibration.

Further, if the display unit 151 is operated, for example, if a phone call is received, or if the display unit 151 in a touchscreen type is operated by tough (S200(2)), the illumination unit 50 and/or the alarm unit 153 is operated (S300(2)).

Further, if the alarm unit 153 is first operated (S200(3)), the display unit 151 and/or the illumination unit 50 is operated (S300(3)).

Through such a method, the illumination unit is controlled in an interlocking state with respective parts of the output unit (the audio output module, the haptic module, etc.) of the mobile terminal, thereby providing various and mysterious illumination effects.

FIGS. 9(*a*) and 9(*b*) illustrate a mobile terminal in accordance with another embodiment of the present invention. A description of parts in this embodiment which are substantially the same as or similar to those shown in FIGS. 1 to 8 will be omitted.

In this embodiment, as shown in FIGS. 9(*a*) and 9(*b*), in addition to the left and right edge parts 101e and 102e of the front housing 101 and the rear housing 102, upper and lower edge parts 101e(*u*), 102e(*u*), 101e(*l*), and 102e(*l*) of the front housing 101 and the rear housing 102 are rounded. Therefore, the upper and lower edge parts 101e(*u*), 102e(*u*), 101e(*l*), and 102e(*l*) of the front housing 101 and the rear housing 102 exhibit the same effect as the left and right edge parts 101e and 102e of the front housing 101 and the rear housing 102 which are rounded or bent.

Figure 10:
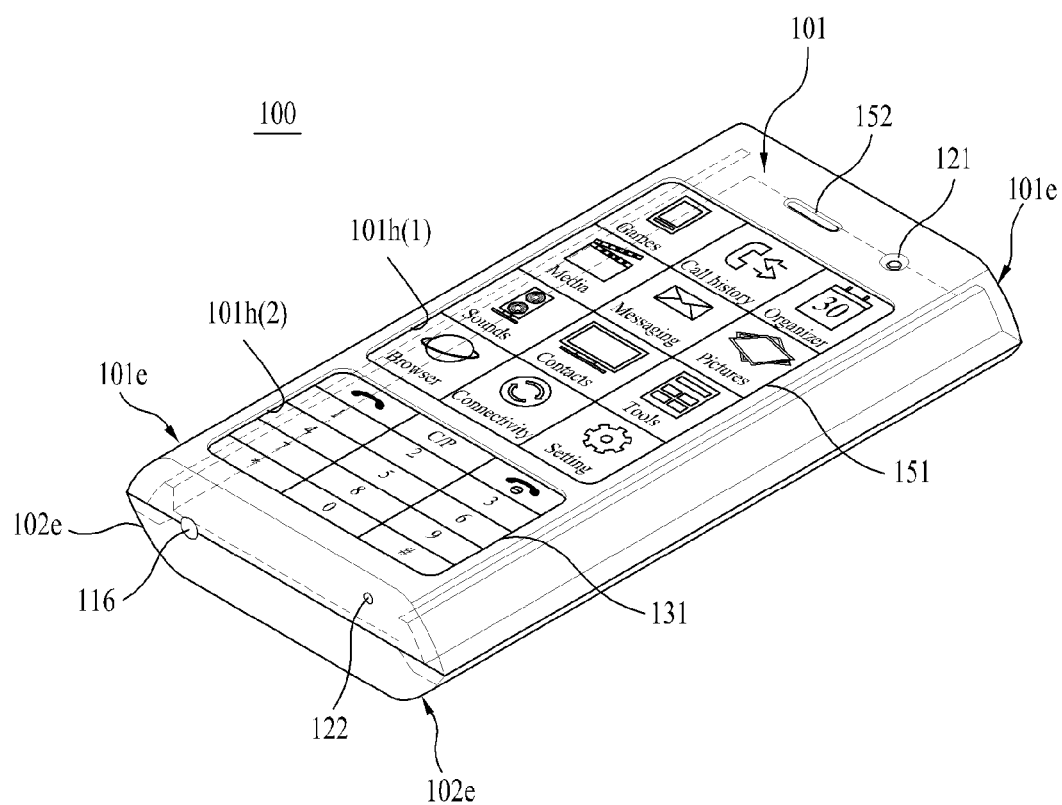
FIG. 10 is a perspective view of a mobile terminal in accordance with another embodiment of the present invention.

FIG. 10 illustrates a mobile terminal in accordance with another embodiment of the present invention. FIG. 10 illustrates a first opening 100h(1) and a second opening 100h(2) formed through the front housing 101 so as to expose the display unit 151 and the user input unit 131 to the outside of the front housing 101, respectively.

This embodiment of the present invention provides the mobile terminal including the front housing 101 made of a light-transmitting material and provided with edge parts 101e, at least one of which is rounded or bent to be inclined, and a plurality of openings including at least the first opening 100h(1) and the second opening 100h(2), the display unit 151 mounted so as to be exposed through the first opening 100h(1), and at least one user input unit 131 mounted so as to be exposed through the second opening 100h(2) and enabling a plurality of user inputs.

That is, differing from the former embodiment in which the front housing 101 covers the display unit 151 or the user input unit 13, in the embodiment, as shown in FIG. 10, the display unit 151 and the user input unit 131 are exposed to the outside, and thus a constant pressure type touchscreen may be mounted and a constant pressure type user input unit may be mounted.

Figure 11:
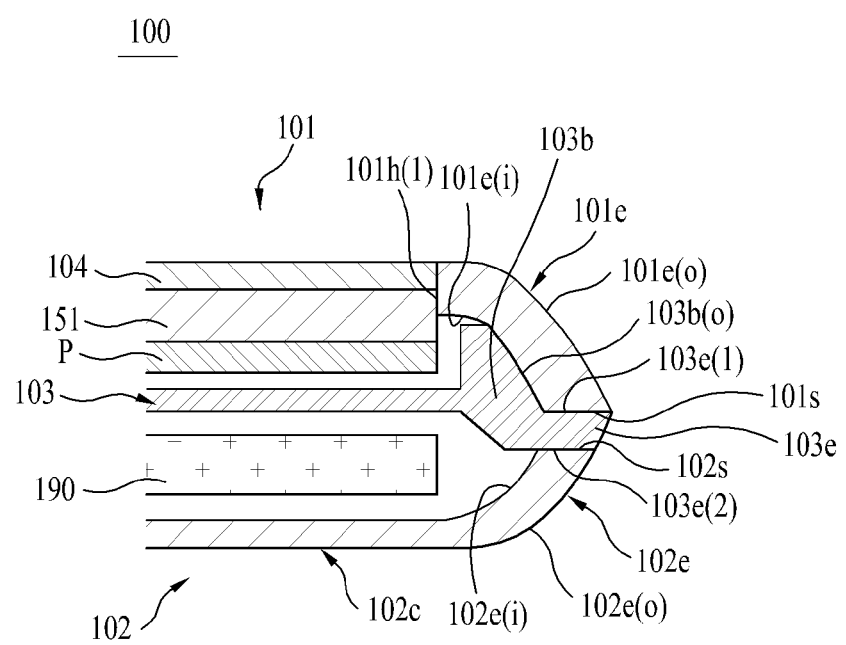
FIG. 11 is a sectional view of a mobile terminal in accordance with another embodiment of the present invention.

FIG. 11 illustrates a mobile terminal in accordance with another embodiment of the present invention. In more detail, FIG. 11 is a partial sectional view of the mobile terminal 100 in accordance with this embodiment.

The mobile terminal 100 in accordance with this embodiment further includes a window 104, compared with the mobile terminal 100 in accordance with the embodiment, as shown in FIG. 10.

That is, in the mobile terminal 100 in accordance with this embodiment, the window 104 is mounted at least one of the plurality of openings 101h(1) and 101h(2) formed through the front housing 101. In general, a window is provided so as to protect liquid crystals. Therefore, in this embodiment, the window 104 is provided above the display unit 151. That is, the window 104 is mounted at the first opening 101h(1) in which the display unit 151 is mounted.

In the mobile terminal in accordance with the present invention, at least one of the front housing edge parts is rounded or bent to be inclined, as described above, thereby inducing optical illusions due to the lens effect.

In the mobile terminal in accordance with the embodiment, as shown in FIGS. 2(*a*) and 2(*b*), the edge parts 101e and 102e of the front housing 101 and the second housing 102 are rounded, and the display unit 151 is provided under the front housing 101.

Further, in the mobile terminal in accordance with the embodiment, as shown in FIG. 10, the display unit 151 and the user input unit 131 are mounted in the first opening 100h(1) and the second opening 100h(2) formed through the front housing 101, respectively.

However, these embodiments illustrate some examples of the mobile terminal which induces optical illusions due to the lens effect at the edge parts thereof.

Therefore, the present invention may be applied to any mobile terminal which includes edge parts made of a light-transmitting material and in which the outer surface at least one edge part out of the edge parts is rounded. That is, although edge parts of a front housing of a mobile terminal do not form edge parts of the mobile terminal, the mobile terminal may fall within the scope of the present invention.

Figure 12:
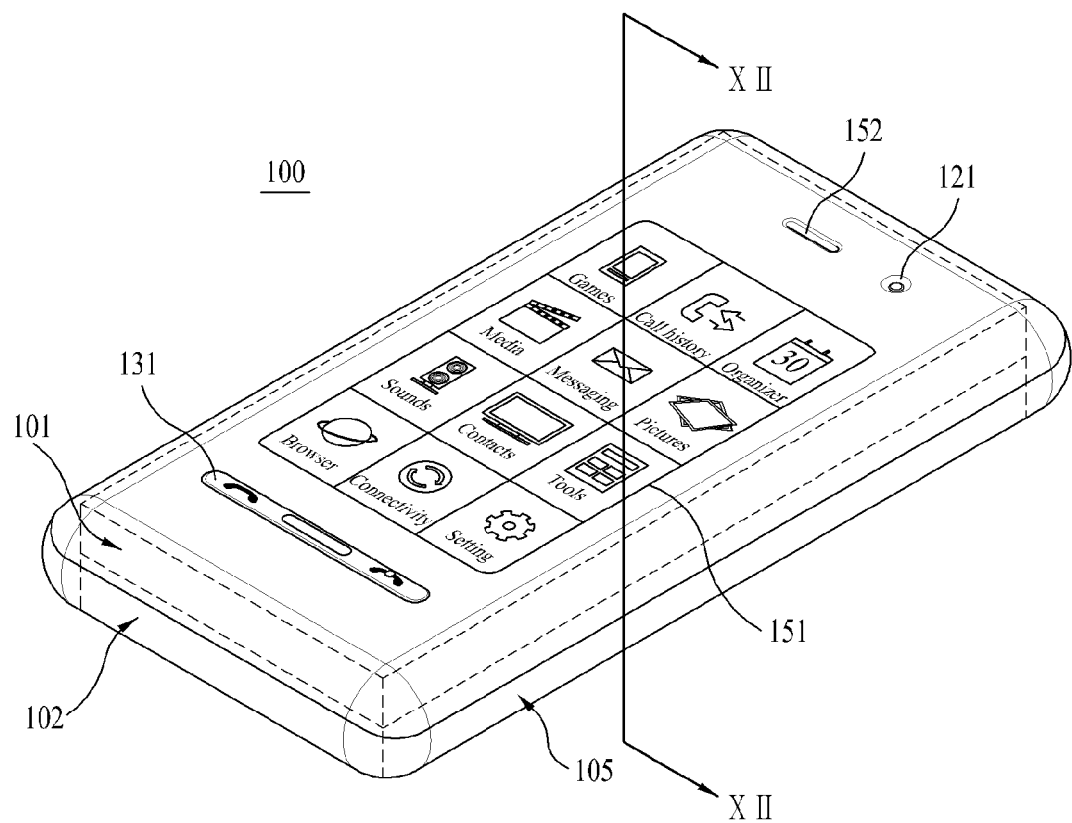
FIGS. 12 and 13 are perspective and sectional views of a mobile terminal in accordance with a further embodiment of the present invention, respectively.
Figure 13:
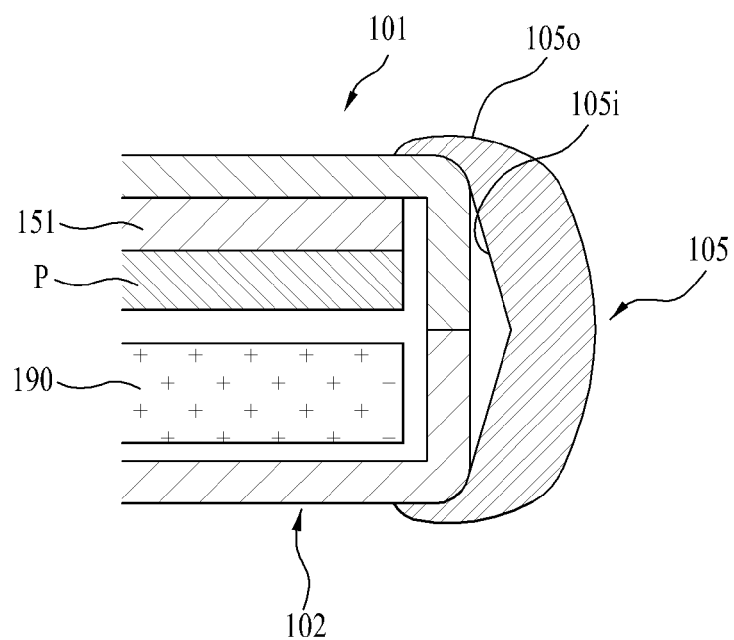

For example, curved edge parts inducing optical illusions due to the lens effect may be separately attached to a terminal body of a mobile terminal including a front housing or a rear housing. FIGS. 12 and 13 illustrate such a mobile terminal.

FIG. 12 is a perspective view of a mobile terminal in accordance with a further embodiment of the present invention differing from the above-described embodiments, and FIG. 13 is a sectional view of the mobile terminal of FIG. 12, taken along the line XII-XII.

As shown in FIGS. 12 and 13, the mobile terminal 100 in accordance with this embodiment includes a display unit 151, at least one housing to accommodate the display unit 151, and at least one curved edge part 105 attached to the side surface of the housing and made of a light-transmitting material. An outer surface 1050 of the curved edge part 105 is rounded.

In this embodiment, the housing includes a front housing 101 and a rear housing 102. Edge parts of the front housing 101 and the rear housing 102 constituting the housing are not rounded or not bent to be inclined, but the curved edge part 105 made of the light-transmitting material and attached to the side surface of the housing induces an optical illusion due to the lens effect.

That is, since the outer surface 105o of the curved edge part 105 is rounded, an object located at the outside of the curved edge part 105 instead of an inner region of the curved edge part 105 is observed by a user, thereby exhibiting an effect causing an area of the display unit 151 to seem to be widened.

Further, an inner surface 105i of the curved edge part 105 is a flat surface bent to be inclined, in the same manner as the inner surface 101e(i) of the front housing edge part 101e shown in FIG. 5.

Preferably, the curved edge part 105 is detachably attached to the housing so as to be removed if needed.

Further, although not shown in FIGS. 12 and 13, if an illumination unit is provided within the curved edge part 105, the above-described excellent illumination effect may be provided.

In this manner, edge parts of the front housing and the rear housing are not extended to form edge parts of the terminal body, but the separate curved edge part inducing an optical illusion due to the lens effect may be attached to the terminal body. Such a method is advantageous in that the optical illusion may be induced without limitations to materials and shapes of the housing and the front and rear housings of the terminal body of the mobile terminal.

Accordingly, the present invention provides the following effects and/or advantages.

A mobile terminal in accordance with the present invention causes optical illusions at edge parts of a front housing, thereby providing visual mystique.

Further, the mobile terminal in accordance with the present invention allows the bezel part around a display unit to seem to be visually reduced, thereby allowing the size of the display unit to seem to be increased.

Moreover, the side surface of the mobile terminal in accordance with the present invention is curved so as to cause the optical illusion, thereby improving a gripping sense of a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a front housing made of a light-transmitting material and provided with edge parts, at least one of which is rounded or bent to be inclined;
   a display unit provided under the front housing;
   a circuit substrate provided under the display unit;
   a rear housing to accommodate the display unit and the circuit substrate together with the front housing; and
   a middle housing provided between the front housing and the rear housing,
   wherein the middle housing includes a receipt part to accommodate the display unit, and boundary parts connecting the receipt part and edge parts of the middle housing and disposed under the edge parts of the front housing, and
   wherein the edge part of the middle housing is protruded from the boundary part of the middle housing in a horizontal direction.

2. The mobile terminal according to claim 1, wherein the at least one edge part rounded or bent to be inclined is extended from a display region shielding an upper surface of the display unit in a direction toward the rear housing, and at least a pair of edge parts being parallel with each other out of the edge parts of the front housing is rounded or bent to be inclined.

3. The mobile terminal according to claim 1, wherein one side surface of the boundary part has a shape corresponding to the inner surface of the edge part of the front housing.

4. The mobile terminal according to claim 3, wherein the boundary part located under the inner surface of the edge part of the front housing is provided with an inwardly inclined surface.

5. The mobile terminal according to claim 1, wherein the edge part of the front housing and an edge part of the rear housing are extended to contact an upper surface and a lower surface of the edge part of the middle housing, respectively, and an outer surface of the mobile terminal is formed to have a curved surface through the front housing, the middle housing, and the rear housing.

6. The mobile terminal according to claim 1, wherein a plurality of LEDs is mounted on the boundary part or the edge part of the middle housing under the condition that the plurality of the LEDs is separated from each other in the lengthwise direction of the boundary part or the edge part of the middle housing.

7. The mobile terminal according to claim 6, further comprising an LED circuit substrate, on which the plurality of the LEDs is mounted,
   wherein the LED circuit substrate is mounted on the boundary part or the edge part of the middle housing.

8. The mobile terminal according to claim 7, wherein the LED circuit substrate is embedded in the boundary part or the edge part of the middle housing.

9. The mobile terminal according to claim 6, wherein a diffusion member to diffuse light is provided on upper surfaces of the plurality of the LEDs.

10. The mobile terminal according to claim 7, wherein the LED circuit substrate includes a plurality of touch sensors or proximity sensors.

11. The mobile terminal according to claim 10, wherein the LED circuit substrate is divided into a plurality of touch regions in which the touch sensors or the proximity sensors are respectively mounted, and at least one LED is mounted in each touch region.

12. The mobile terminal according to claim 11, wherein a touch signal or a proximity signal sensed by the touch sensor or the proximity sensor provided in a specific touch region out of the touch regions is used as a control signal of the LED mounted in the specific touch region.

13. The mobile terminal according to claim 1, wherein an outer surface of the edge parts of the front housing is a curved surface, and an inner surface of the edge parts of the front housing is a flat surface.

14. The mobile terminal according claim 1, wherein the rear housing is made of a light-transmitting material and is provided with edge parts, at least one of which is rounded or bent to be inclined.

15. A mobile terminal comprising:
   a front housing made of a light-transmitting material, and provided with edge parts, at least one of which is rounded or bent to be inclined, and a plurality of openings including at least a first opening and a second opening;

a display unit mounted in the first opening of the front housing;

at least one user input unit mounted in the second opening of the front housing and enabling a plurality of user inputs;

a rear housing to accommodate the display unit and the circuit substrate together with the front housing; and a middle housing provided between the front housing and the rear housing, wherein the middle housing includes a receipt part to accommodate the display unit, and boundary parts connecting the receipt part and edge parts of the middle housing and disposed under the edge parts of the front housing, and wherein the edge part of the middle housing is protruded from the boundary part of the middle housing in a horizontal direction.

16. The mobile terminal according to claim 15, wherein a window is mounted at at least one of the plurality of openings.

17. A mobile terminal comprising:
a display unit;
at least one housing to accommodate the display unit;
at least one curved edge part, an outer surface of which is rounded, attached to a side surface of the at least one housing and made of a light-transmitting material; and
a middle housing provided in the housing,
wherein the middle housing includes a receipt part to accommodate the display unit, and boundary parts connecting the receipt part and edge parts of the middle housing and disposed under the edge parts of the front housing, and
wherein the edge part of the middle housing is protruded from the boundary part of the middle housing in a horizontal direction.

18. The mobile terminal according to claim 17, wherein an inner surface of the at least one curved edge part is a flat surface bent to be inclined.

* * * * *